(12) United States Patent
Iwata

(10) Patent No.: US 11,038,228 B2
(45) Date of Patent: Jun. 15, 2021

(54) ELECTROCHEMICAL DEVICE HAVING A THERMALLY FUSIBLE RESIN LAYER

(71) Applicant: NEC ENERGY DEVICES, LTD., Sagamihara (JP)

(72) Inventor: Naoyuki Iwata, Kanagawa (JP)

(73) Assignee: Envision AESC Energy Devices Ltd., Sagamihara (JP)

(*) Notice: Subject to any disclaimer, the term of this patent is extended or adjusted under 35 U.S.C. 154(b) by 156 days.

(21) Appl. No.: 16/318,865

(22) PCT Filed: Jul. 24, 2017

(86) PCT No.: PCT/JP2017/026660
§ 371 (c)(1),
(2) Date: Jan. 18, 2019

(87) PCT Pub. No.: WO2018/016654
PCT Pub. Date: Jan. 25, 2018

(65) Prior Publication Data
US 2019/0189978 A1 Jun. 20, 2019

(30) Foreign Application Priority Data
Jul. 22, 2016 (JP) .............................. JP2016-144671

(51) Int. Cl.
*H01M 50/124* (2021.01)
*H01M 10/04* (2006.01)
(Continued)

(52) U.S. Cl.
CPC ......... *H01M 50/124* (2021.01); *H01M 10/04* (2013.01); *H01M 50/116* (2021.01);
(Continued)

(58) Field of Classification Search
CPC .......................... H01M 2/0287; H01M 2/021
See application file for complete search history.

(56) References Cited

U.S. PATENT DOCUMENTS

2014/0329122 A1* 11/2014 Hatta ..................... B29C 65/02
429/94
2017/0271629 A1* 9/2017 Hori .................... H01M 2/0275
2019/0148682 A1* 5/2019 Ojiri ..................... H01G 11/78
429/163

FOREIGN PATENT DOCUMENTS

JP 2001-176465 A 6/2001
JP 2001-297738 A 10/2001
(Continued)

OTHER PUBLICATIONS

International Search Report for PCT/JP2017/026660 dated Aug. 29, 2017 [PCT/ISA/210].

*Primary Examiner* — Wyatt P McConnell
(74) *Attorney, Agent, or Firm* — Sughrue Mion, PLLC

(57) ABSTRACT

An electrochemical device comprising an electrode assembly in which two types of electrodes are stacked or wound with separators interposed therebetween and an outer container that accommodates the electrode assembly; wherein electrode terminals extend to the outside from within the outer container. The films which cover the electrode assembly overlap each other on the outside of the outer peripheral portion of the electrode assembly, and the outer container is formed by bonding the films to each other. The portion of the films that overlap and are bonded to each other comprises a first sealed portion in which the films overlap and are bonded to each other in an overlapping state with the electrode terminals interposed therebetween, and comprises a second sealed portion in which the films are bonded to each other in a directly overlapping state without interposition of the electrode terminals.

11 Claims, 4 Drawing Sheets

(51) Int. Cl.
- *H01M 50/116* (2021.01)
- *H01M 50/172* (2021.01)
- *H01M 50/183* (2021.01)
- *H01M 50/543* (2021.01)

(52) U.S. Cl.
CPC ....... *H01M 50/172* (2021.01); *H01M 50/183* (2021.01); *H01M 50/543* (2021.01)

(56) References Cited

FOREIGN PATENT DOCUMENTS

| | | |
|---|---|---|
| JP | 2004-111303 A | 4/2004 |
| JP | 2006-164868 A | 6/2006 |
| JP | 2012-109125 A | 6/2012 |
| WO | 2015/141772 A1 | 9/2015 |

* cited by examiner

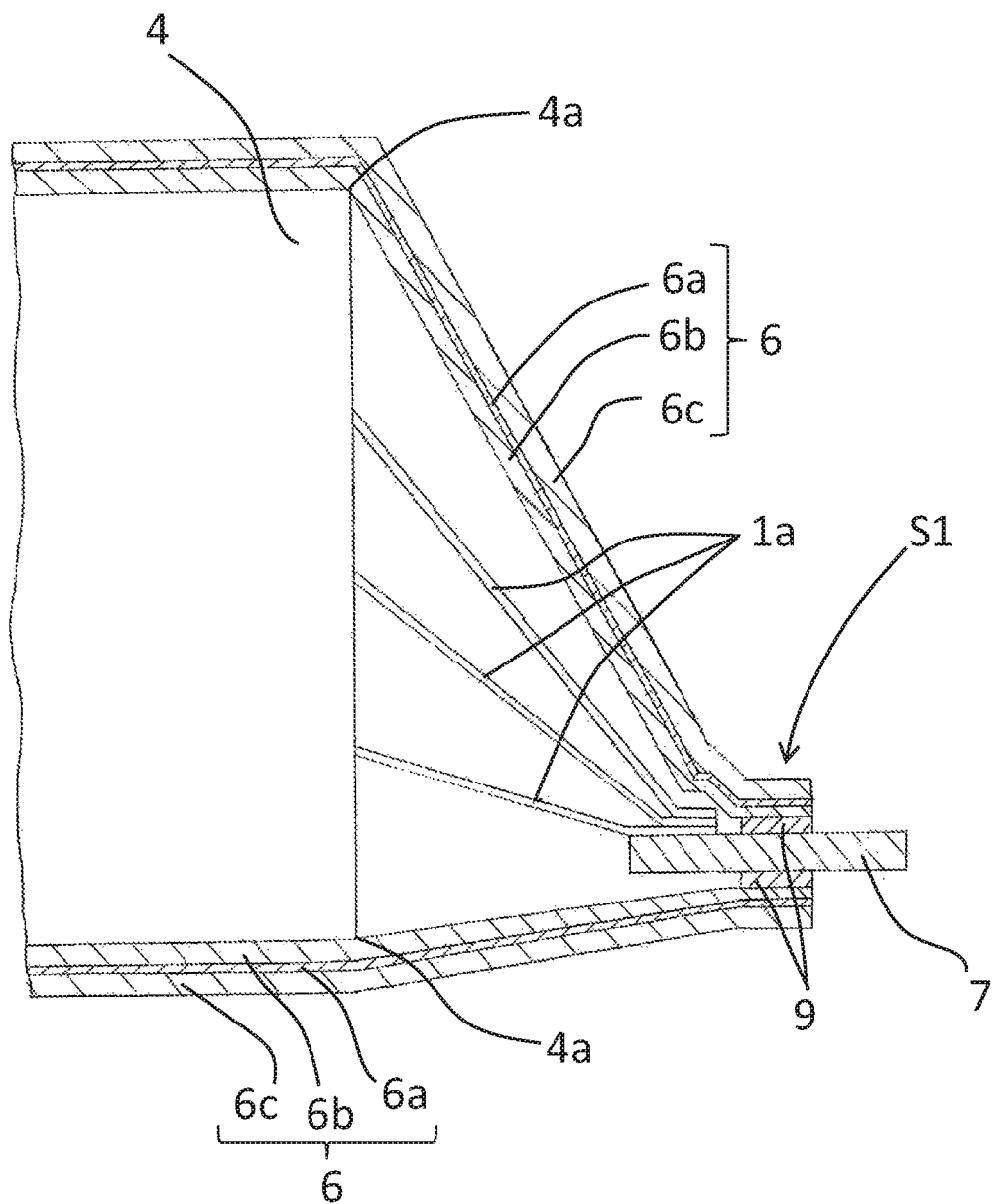

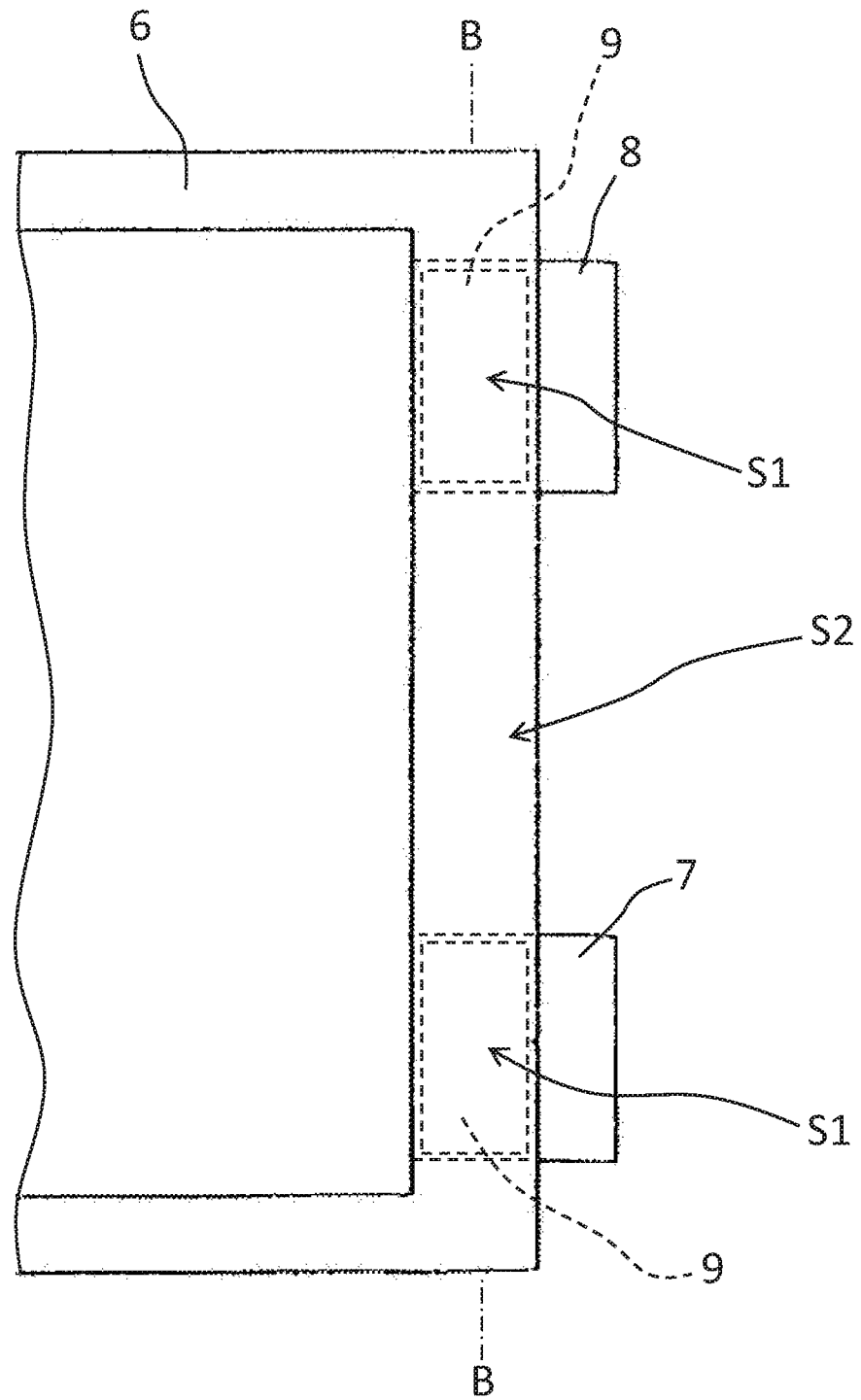

ELECTROCHEMICAL DEVICE HAVING A THERMALLY FUSIBLE RESIN LAYER

CROSS REFERENCE TO RELATED APPLICATIONS

This application is a National Stage of International Application No. PCT/JP2017/026660 filed Jul. 24, 2017, claiming priority based on Japanese Patent Application No. 2016-144671 filed Jul. 22, 2016, the disclosure of which is incorporated herein in its entirety by reference.

TECHNICAL FIELD

The present invention relates to an electrochemical device.

BACKGROUND ART

Electrochemical devices such as secondary batteries are widely used as electric power sources of cellular phones, digital still cameras, laptop computers, electric vehicles and home energy storage systems. A typical electrochemical device is composed of an electrode assembly in which two types of electrode sheets, i.e., a positive electrode and a negative electrode are wound or laminated and a separator separates the positive electrode and the negative electrode. The electrode assembly and electrolyte are housed in an outer container. The outer container is made up from a flexible film.

More specifically, the electrode assembly is covered by flexible films from upper and lower sides in stacking direction of the positive electrodes and negative electrodes. The upper and lower films overlap each other on the outside of the outer periphery of the electrode assembly. In the portions in which the films overlap, the films are bonded together to thus form the outer container. The electrode assembly is provided with a positive electrode terminal and a negative electrode terminal, for connecting each electrode to an outer electrical circuit. The electrode terminals extend toward the outside from the inside of the outer container. Because the electrode terminals pass through a portion of the outer container, in a part of the overlapping and bonded portion of the upper and lower films, the films indirectly overlap each other and are bonded to each other with the electrode terminals interposed therebetween.

Patent Document 1 discloses one example of the film that makes up the outer container. The film is a laminated film having a multilayered structure in which a thermally fusible resin layer is formed on one surface of a metal foil and an epoxy resin layer is formed on the other surface. On the outside of the electrode assembly, the thermally fusible resin layers of the upper and lower laminated films overlap each other. The overlapping thermally fusible resin layers are bonded to each other, thereby forming the outer container. However, Patent Document 1 does not refer to the thickness of the laminated films after being bonded to each other, in the completed outer container.

Patent Document 2 discloses the difference in thickness between the portion in which the upper and lower laminated films directly overlap and are bonded to each other and the portion in which the upper and lower laminated films indirectly overlap and are bonded to each other with the electrode terminals interposed therebetween, when the outer container is made up from the laminated films similar to the films of Patent Document 1. Patent Document 3 specifies the total thickness of the portion in which the upper and lower laminated films indirectly overlap and are bonded to each other with the electrode terminals interposed therebetween.

PRIOR ART DOCUMENTS

Patent Documents

Patent Document 1: Japanese Unexamined Patent Application Laid-open No. 2001-176465
Patent Document 2: Japanese Unexamined Patent Application Laid-open No. 2004-111303
Patent Document 3: Japanese Unexamined Patent Application Laid-open No. 2012-109125

SUMMARY OF THE INVENTION

Problem to be Solved by the Invention

In the structure described in Patent Document 2, the thickness of the laminated films, in particular the thickness of the thermally fusible resin layers, is decreased in the portions in which the upper and lower laminated films indirectly overlap and are bonded to each other with the electrode terminals interposed therebetween. There is concern that electrical insulation may become insufficient due to decrease in the thickness of the laminated films in these portions. In addition, in the vicinities of the electrode terminals, there is concern that the bonding strength may be partially reduced and sealing may become insufficient to cause leakage of the electrolyte.

Patent Document 3 specifies the total thickness of portions in which the upper and lower laminated films indirectly overlap and are bonded to each other with the electrode terminals interposed therebetween. However, there is a concern that there may be a partial decrease in the bonding strength and insufficient sealing in the vicinities of the electrode terminals, depending on the relationship between the total thickness of the abovementioned portions and the thickness of the portions in which the laminated films directly overlap and are bonded to each other. This situation will cause leakage of the electrolyte.

It is an object of the present invention to solve the above-described problems and to provide an electrochemical device that realizes sealing with high bonding strength over the entire outer container, while maintaining sufficient insulating characteristics, particularly in the vicinities of the electrode terminals.

Means to Solve the Problem

An electrochemical device comprising an electrode assembly in which two types of electrodes are stacked or wound with separators interposed therebetween and an outer container that accommodates the electrode assembly; wherein electrode terminals are connected to the electrodes and the electrode terminals extend to the outside from within said outer container. The outer container is composed of film, the films overlap each other on the outside of the outer peripheral portion of the electrode assembly in a state in which the films cover the electrode assembly, and the outer container is formed by bonding the films to each other. The portion of the films that overlap and are bonded to each other on the outside of the outer peripheral portion of the electrode assembly, comprises a first sealed portion in which the films overlap and are bonded to each other in an overlapping state with the electrode terminals interposed therebetween, and comprises a second sealed portion in which the films are bonded to each other in a directly overlapping state without interposition of the electrode terminals. Assuming the thickness of the film at a position where the film overlaps a flat portion of the electrode assembly is 1, the thickness of the film at a position where the film is in contact with corner portion of the electrode assembly is 0.85-0.95, the thickness of the film at the first sealed portions is 0.65-0.85, the thickness of the film at the second sealed portion is 0.55-0.75, and the thickness of the film at the first sealed portion is larger than the thickness of the film at the second sealed portion.

Effect of the Invention

The present invention can realize sealing with high bonding strength over the entire outer container in an electrochemical device, while maintaining sufficient insulating characteristics, particularly in the vicinities of the electrode terminals.

BRIEF DESCRIPTION OF THE DRAWINGS

FIG. 2 is an enlarged view of the principal parts of FIG. 1B.

FIG. 3 is an enlarged view of the principal parts of FIG. 1A.

EXEMPLARY EMBODIMENTS OF THE INVENTION

Exemplary embodiments of the present invention are described with reference to the accompanying drawings.

Figure 1A:
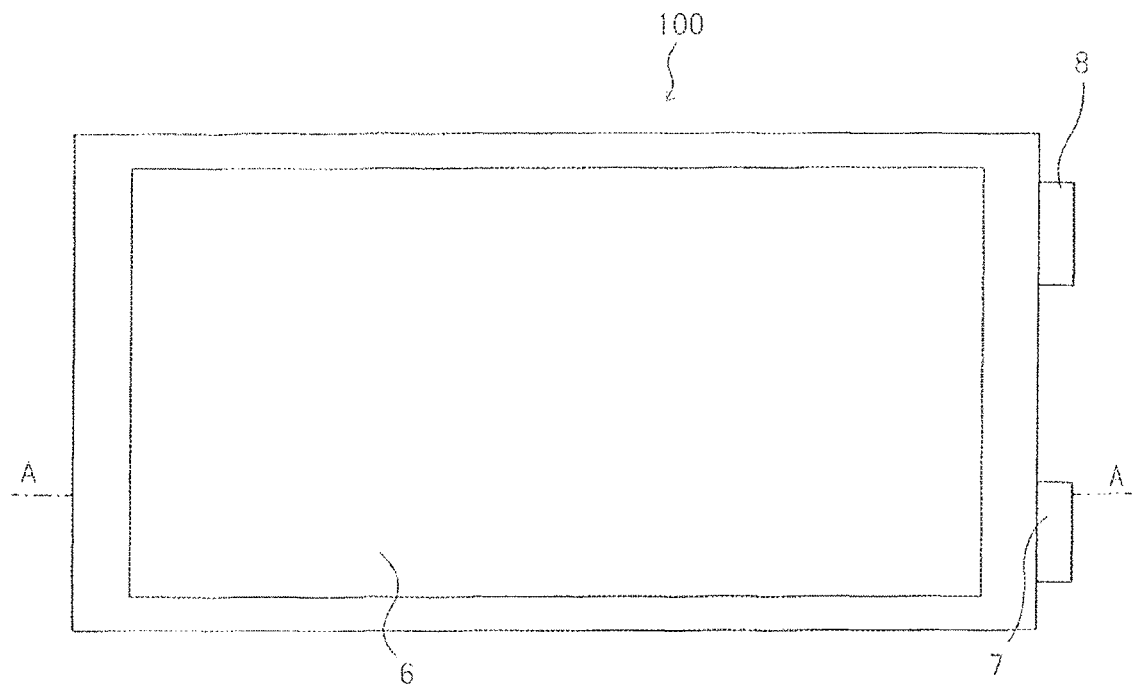
FIG. 1A is a top view showing the basic structure of a secondary battery that is an exemplary embodiment of the electrochemical device of the present invention.
Figure 1B:
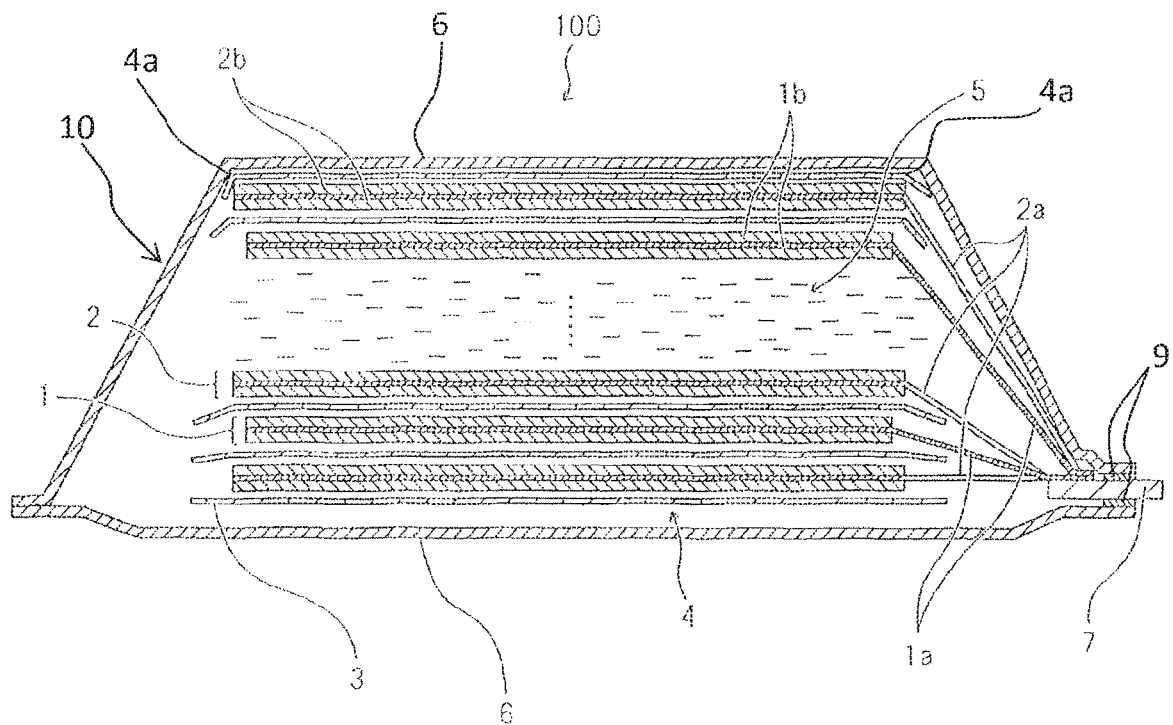
FIG. 1B is a cross-sectional view taken along line A-A of FIG. 1A.

FIGS. 1A and 1B schematically show the structure of a laminated-type lithium-ion secondary battery 100 that is one example of the electrochemical device of the first exemplary embodiment of the present invention. FIG. 1A is a top view as seen from perpendicularly above the principal surface that is a flat portion of secondary battery 100. FIG. 1B is a cross-sectional view taken along line A-A of FIG. 1A.

Lithium-ion secondary battery 100 of the present invention is provided with electrode assembly 4 in which two types of electrodes, i.e., positive electrode sheets 1 and negative electrode sheets 2 are laminated on each other with separators 3 interposed therebetween. Electrode assembly 4 is accommodated together with electrolyte 5 in the interior of outer container 10 made up from flexible film 6. One end portion of positive electrode terminal 7 is connected to positive electrodes 1 of electrode assembly 4. One end portion of negative electrode terminal 8 is connected to negative electrodes 2. The other end portion of positive electrode terminal 7 and the other end portion of negative terminal 8 each outwardly extend from outer container 10. In FIG. 1B, the layers positioned in the middle portion in the thickness direction of electrode assembly 4 are omitted from the drawing, and electrolyte 5 is shown. Therefore, current collectors of the omitted electrodes in the middle portion of electrode assembly 4, are also omitted from the drawing in portions in which tabs 1a that are part of the current collectors of positive electrodes 1 overlap positive electrode terminals 7 and in portions in which tabs 2a that are part of the current collectors of negative electrodes 2 overlap negative electrode terminals 8. Although positive electrodes 1, negative electrodes 2, separators 3 and flexible film 6 are shown as not being in contact with each other in FIG. 1B, in the interest of clarity, these components are laminated in close contact with each other in actually. Accordingly, electrode assembly 4 is a single unit having unified structure as shown schematically in FIG. 2. Films 6 are bent at corner portions 4a of electrode assembly 4, for example, at the corner portions of separators 3 that are located uppermost and lowermost in the example shown in FIG. 1B, to envelope electrode assembly 4 that is a single unit.

Each of positive electrodes 1 comprises positive electrode current collector 1a and positive electrode active material layer 1b coated on positive electrode current collector 1a. There are coated portion in which positive electrode active material layer 1b is formed and non-coated portion in which positive electrode active material layers 1b is not formed. Coated portion and non-coated portion are aligned along the longitudinal direction on the obverse surface and reverse surface of positive electrode current collector 1a. Each of negative electrodes 2 comprises negative electrode current collector 2a and negative electrode active material layers 2b coated on negative electrode current collector 2a. Coated portion and non-coated portion are aligned along the longitudinal direction on the obverse surface and reverse surface of negative electrode current collector 2a.

Each of non-coated portions 1a and 2a is respectively used as a positive electrode tab and negative electrode tab for connecting with positive electrode terminal 7 and negative electrode terminal 8. Non-coated portions of positive electrodes 1 are gathered together on positive electrode terminal 7 and connected to each other by ultrasonic welding. Although not shown in FIGS. 1B and 2, non-coated portions of negative electrodes 2 are gathered together on negative electrode terminal 8 and connected to each other by ultrasonic welding. The other end portion of positive electrode terminal 7 and the other end portion of negative electrode terminal 8 each extend to the exterior of outer container 10 made up from flexible film 6. The outer dimensions of negative electrode active material layers 2b are larger than the outer dimensions of positive electrode active material layers 1b, and preferably equal to or smaller than the outer dimensions of separators 3.

Upper and lower films 6 enclose electrode assembly 4 and their outer peripheral portions overlap each other. Overlapping portions of upper and lower films 6 are bonded to each other to form outer container 10 having a sealed outer peripheral portion. Here, the descriptions "upper" and "lower" refer to one side and the other side in the stacking direction of positive electrodes 1 and negative electrodes 2.

As shown in FIG. 2, film 6 of the present exemplary embodiment is a laminated film having multilayered structure in which resin layers 6b and 6c are provided on both surfaces of metal foil 6a that is a substrate. Metal foil 6a is made up of, for example, aluminum or stainless steel having a barrier property that prevents leakage of electrolyte 5 and infiltration of moisture from the outside. The inner resin layer is thermally fusible resin layer 6b made up of, for example, modified polyolefin. The outer resin layer is another resin layer 6c made up of, for example, a nylon film, a polyethylene terephthalate film, or a polyester film. Thermally fusible resin layer 6b of upper film 6 and thermally fusible resin layer 6b of lower film 6 overlap each other on the outside of the outer peripheral portion of electrode assembly 4. In this state, heat and pressure are applied from the outside by means of a heating jig, such as seal bar so that thermally fusible resin layers 6b of upper and lower films 6 may be thermally fused together. However, at the portions through which positive electrode terminal 7 and negative electrode terminal 8 extend to the outside from within outer container 10, upper and lower films 6 indirectly overlap each other with positive electrode terminal 7 or negative electrode terminal 8 interposed therebetween. Sealant 9 of thermally fusible resin is provided beforehand on both surfaces of positive electrode terminal 7 and negative electrode terminal 8. Accordingly, sealant 9 and thermally fusible resin layers 6b of films 6 are thermally fused on each surface of positive electrode terminal 7 and negative electrode terminal 8. In this way, thermally fusible resin layer 6b of upper film 6 and thermally fusible resin layer 6b of lower film 6 are fixed together with sealant 9 and positive electrode terminal 7 and negative electrode terminal 8 interposed therebetween.

Figure 4:
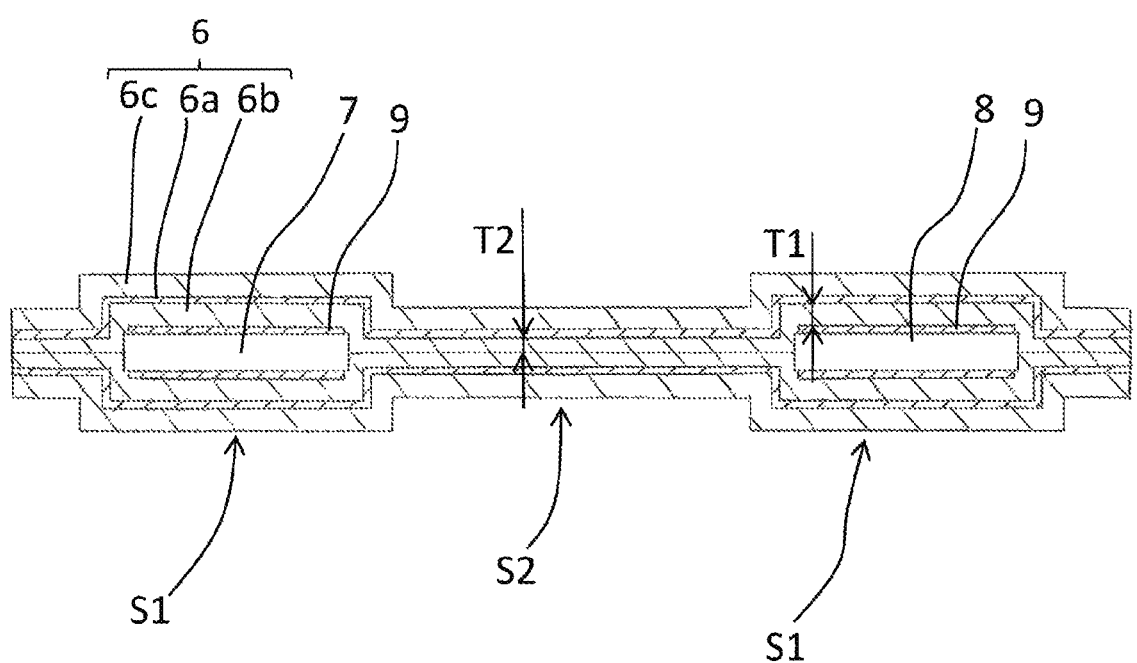
FIG. 4 is a cross-sectional view taken along line B-B of FIG. 3.

As described hereinabove, on the outside of the outer peripheral portion of electrode assembly 4, upper and lower films 6 either directly overlap each other or indirectly overlap each other with sealant 9 and positive electrode terminal 7 or negative electrode terminal 8 interposed therebetween. In this state, upper and lower films 6 are fixed together, thereby forming outer container 10. Typically, in a sealing step, films 6 become thinner due to the application of heat and pressure for thermally fusing. The inventors of the present invention focused on this partial thinning. In particular, in the side through which positive electrode terminal 7 and negative electrode terminal 8 extend as shown in FIGS. 3 and 4, there are portions at which films 6 indirectly overlap each other with positive electrode terminal 7 or negative electrode terminal 8 interposed therebetween. These portions are referred to as "first sealed portions S1". Further, in the abovementioned side, there is a portion at which films 6 directly overlap each other. This portion is between positive electrode terminal 7 and negative electrode terminal 8, and is referred to as "second sealed portion S2". In other words, in the example shown in the figures, two first sealed portions S1 are aligned on one side of the outer container, and second sealed portion S2 is positioned between first sealed portions S1. In the present invention, the thickness of films 6 at first sealed portions S1 is greater than the thickness of films 6 at second sealed portion S2. In particular, when films 6 are laminated films such as shown in FIGS. 2 and 4, thickness T1 of thermally fusible resin layer 6b at first sealed portions S1 is greater than thickness T2 of thermally fusible resin layer 6b at second sealed portion S2.

The reason why thickness T1 of thermally fusible resin layer 6b at first sealed portions S1 is greater than thickness T2 of thermally fusible resin layer 6b at second sealed portion S2 as described hereinabove, will be described. If positive electrode terminal 7 and negative electrode terminal 8 come into contact with metal foil 6a of film 6 that forms outer container 10, there is a danger of causing following problems. The problems are electrical short circuit and heat generation to reduce the performance of the electrochemical device, vaporization or deterioration of the electrolyte, ignition and explosion. Accordingly, thermally fusible resin layer 6b must have sufficient thickness to ensure electrical insulation after thermally fusing at first sealed portions S1 where positive electrode terminal 7 or negative electrode terminal 8 is interposed between upper and lower films 6.

At second sealed portion S2 where upper and lower films 6 directly overlap each other without interposition of positive electrode terminal 7 or negative electrode terminal 8, it is possible to perform heat sealing mainly based on the bonding strength without the need for deep consideration of electrical insulation. Therefore, if heat sealing is performed without distinguishing between second sealed portion S2 and first sealed portions S1, high bonding strength can be obtained at second sealed portion S2. However, there is a possibility that thermally fusible resin layer 6b becomes too thin at first sealed portion S1 so that electrical insulation may be insufficient in the vicinity of positive electrode terminal 7 and negative electrode terminal 8. To prevent this danger, thickness T1 of thermally fusible resin layer 6b at first sealed portions S1 is at least larger than thickness T2 of thermally fusible resin layer 6b at second sealed portion S2, in the present invention.

When whole of films 6 that make up outer container 10 is considered, the thickness is substantially unchanged from the initial state at positions where film 6 overlaps the flat portion that is principal surface of electrode assembly 4. At positions where film 6 is in contact with corner portions 4a of electrode assembly 4, in contrast, flexible film 6 bends and thus becomes slightly thinner, as shown in FIG. 2. If the thickness of flexible film 6 at positions where flexible film 6 overlaps the flat portion of electrode assembly 4 which is referred to as "reference thickness" is assumed to be "1", the thickness of flexible film 6 at positions where it is in contact with corner portions 4a of electrode assembly 4 is in the order of 0.85-0.95. When such flexible films 6 are thermally fused together in an overlapping state, heat and pressure are applied by means of a seal bar that is a heating jig (not shown in the figures). As a result, film 6 becomes thinner. In particular, in the side through which positive electrode terminal 7 and negative electrode terminal 8 extend as shown in FIGS. 3 and 4, the thickness of films 6 at second sealed portion S2 which is configured mainly for obtaining high bonding strength is in the order of 0.55-0.75 in comparison to the reference thickness of "1". At first sealed portions S1 where it is necessary to have high electrical insulation as described hereinabove, the thickness of films 6 is in the order of 0.65-0.85 in comparison to the reference thickness of "1". Further, as described hereinabove, the thickness of films 6 at first sealed portions S1 is larger than the thickness of films 6 in second sealed portion S2. When the thickness of films 6 at first sealed portions S1 is 0.65-0.85 and the thickness of films 6 at second sealed portion S2 is 0.55-0.85 in comparison to the reference thickness of "1", the thickness at first sealed portions S1 is 1.1-1.2 times the thickness at second sealed portion S2.

This ratio of the thicknesses of each portion means the ratio of the thickness of the whole of films 6 when film 6 has a single-layer structure. However, when film 6 is a laminated film as previously described, the ratio of the thicknesses of each portion means the ratio of the thicknesses of thermally fusible resin layer 6b. As one example, when the thickness of thermally fusible resin layer 6b in its initial state is 50-200 μm, it is very effective to specify the ratio of the thicknesses of each part of thermally fusible resin layer 6b described above. The difference in thickness of thermally fusible resin layer 6b between first sealed potions S1 and second sealed portion S2 can be realized by setting the seal bar that is the heating jig. In addition, the difference in the thickness described above can also be realized by using the heat dissipation of positive electrode terminal 7 and negative electrode terminal 8. Namely, temperature increase in first sealed portions S1 can be prevented or reduced by the heat dissipation of positive electrode terminal 7 and negative electrode terminal 8, whereby it is possible to prevent or reduce the flow (effusion to the outside) of the thermally fusion resin due to softening caused by heat. In this way, it is possible to prevent or reduce excessive thinning of the thermally fusible resin layer. In this case, it is possible to perform extremely stable heat sealing and to easily form outer container 10. The following table 1 shows the thicknesses of thermally fusible resin layers 6b at first sealed portions S1 and second sealed portion S2 of five examples in which outer containers 10 is actually formed by carrying out heat sealing in this way. The thicknesses of thermally fusible resin layers 6b are indicated in comparison to the reference thickness of "1"

TABLE 1

| | First sealed portion (on the positive electrode terminal side) | Second sealed portion (between electrode terminals) | First sealed portion (on the negative electrode terminal side) |
|---|---|---|---|
| 1 | 0.804 | 0.722 | 0.804 |
| 2 | 0.766 | 0.677 | 0.747 |
| 3 | 0.791 | 0.734 | 0.810 |
| 4 | 0.785 | 0.722 | 0.797 |
| 5 | 0.759 | 0.709 | 0.797 |

As described hereinabove, according to the present invention, films 6 that make up outer container 10 are bonded together at high bonding strength, so that excellent sealing is realized and electrical short-circuits in the vicinities of electrode terminals 7 and 8 can be prevented or reduced. Outer container 10 can be formed that is stable and satisfactory. As a result, high-performance electrochemical device 100 can be easily and efficiently fabricated.

The differences in thickness of different parts of the film specified in the present invention are particularly effective at the side through which positive electrode terminal 7 and negative electrode terminal 8 extend as shown in FIGS. 3 and 4. However, although not shown in the figures, it is also possible to make a modification of the present invention in which positive electrode terminal 7 and negative electrode terminal 8 extend from respectively different sides of outer container 10. In this case, the ratio of the thicknesses of the films described above can be adopted at the side through which positive electrode terminal 7 extends and at the side through which negative electrode terminal 8 extends, whereby high insulation in the proximity of positive electrode terminal 7 and negative electrode terminal 8 and sealing with high bonding strength of the whole of outer container 10 can be realized.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention.

This application is based upon and claims the benefit of priority from Japanese Patent Application No. 2016-144671, filed on Jul. 22, 2016, the disclosures of which is incorporated herein in its entirety by reference.

EXPLANATION OF REFERENCE NUMBERS 1 positive electrode
1a positive electrode current collector
1b positive electrode active material layer
2 negative electrode
2a negative electrode current collector
2b negative electrode active material layer
3 separator
4 electrode assembly
5 electrolyte
6 film
6a metal foil
6b thermally fusible resin layer
6c another resin layer
7 positive electrode terminal
8 negative electrode terminal
9 sealant
10 outer container
100 electrochemical device (lithium-ion secondary battery)
S1 first sealed portion
S2 second sealed portion

What is claimed is:

1. An electrochemical device comprising an electrode assembly in which two types of electrodes are stacked or wound with separators interposed therebetween and an outer container that accommodates said electrode assembly; wherein:
   electrode terminals are connected to said electrodes and said electrode terminals extend to the outside from within said outer container;
   said outer container is composed of a film,
   said film is a laminated film in which a thermally fusible resin layer is formed on at least one surface of a metal foil;
   said thermally fusible resin layer overlaps on the outside of an outer peripheral portion of said electrode assembly in a state in which said film covers said electrode assembly, and said outer container is formed by bonding said thermally fusible resin layer;
   a portion of said thermally fusible resin layer of said film that overlaps and is bonded on the outside of the outer peripheral portion of said electrode assembly, comprises a first sealed portion in which said thermally fusible resin layer overlaps and is bonded in an overlapping state with said electrode terminals interposed therebetween, and comprises a second sealed portion in which said thermally fusible resin layer is bonded in a directly overlapping state without interposition of said electrode terminals; and
   assuming the thickness of said thermally fusible resin layer of said film at a position where said film overlaps a flat portion of said electrode assembly is 1, the thickness of said thermally fusible resin layer at a position where the film is in contact with a corner portion of said electrode assembly is 0.85-0.95, the thickness of said thermally fusible resin layer at said first sealed portions is 0.65-0.85, the thickness of said thermally fusible resin layer at said second sealed portion is 0.55-0.75, and the thickness of said thermally fusible resin layer at said first sealed portion is larger than the thickness of said thermally fusible resin layer at said second sealed portion.

2. The electrochemical device as set forth in claim 1, wherein the thickness of said thermally fusible resin layer of said film at said first sealed portions is 1.1-1.2 times that the thickness of said thermally fusible resin layer at said second sealed portion.

3. The electrochemical device as set forth in claim 1, wherein the thickness of said thermally fusible resin layer of said film at a position in which said film overlaps a flat portion of said electrode assembly is 50-200 μm.

4. The electrochemical device as set forth in claim 1, wherein, in said film, said thermally fusible resin layer is formed on one surface of said metal foil and another resin layer is formed on the other surface of said metal foil.

5. The electrochemical device as set forth in claim 2, wherein the thickness of said thermally fusible resin layer of said film at a position in which said film overlaps a flat portion of said electrode assembly is 50-200 µm.

6. The electrochemical device as set forth in claim 2, wherein, in said film, said thermally fusible resin layer is formed on one surface of said metal foil and another resin layer is formed on the other surface of said metal foil.

7. The electrochemical device as set forth in claim 3, wherein, in said film, said thermally fusible resin layer is formed on one surface of said metal foil and another resin layer is formed on the other surface of said metal foil.

8. The electrochemical device as set forth in claim 1, wherein said first sealed portions are aligned on one side of said outer container and said second sealed portion is positioned between said first sealed portions.

9. The electrochemical device as set forth in claim 2, wherein said first sealed portions are aligned on one side of said outer container and said second sealed portion is positioned between said first sealed portions.

10. The electrochemical device as set forth in claim 3, wherein said first sealed portions are aligned on one side of said outer container and said second sealed portion is positioned between said first sealed portions.

11. The electrochemical device as set forth in claim 4, wherein said first sealed portions are aligned on one side of said outer container and said second sealed portion is positioned between said first sealed portions.

\* \* \* \* \*